United States Patent [19]
Heinouchi

[11] Patent Number: 5,574,219
[45] Date of Patent: Nov. 12, 1996

[54] PIEZOELECTRIC VIBRATOR

[75] Inventor: Yoshiaki Heinouchi, Nagaokakyo, Japan

[73] Assignee: Murata Manufacturing Co., Ltd., Kyoto-fu, Japan

[21] Appl. No.: 426,605

[22] Filed: Apr. 21, 1995

[30]   Foreign Application Priority Data

Apr. 26, 1994   [JP]   Japan ................................. 6-112310

[51] Int. Cl.⁶ .................................................. H01L 41/08
[52] U.S. Cl. ........................................ 73/504.12; 310/321
[58] Field of Search ........................... 73/504.12, 504.14, 73/514.29; 310/320, 321, 322, 367, 316

[56]   References Cited

U.S. PATENT DOCUMENTS

| | | | |
|---|---|---|---|
| 2,271,200 | 1/1942 | Mason | 73/504.14 |
| 2,443,471 | 6/1948 | Mason | 73/504.14 |
| 3,369,200 | 2/1968 | Kunemund et al. | 73/504.14 |
| 3,566,313 | 2/1971 | Yuki et al. | 73/504.14 |
| 5,349,261 | 9/1994 | Fujimoto et al. | 73/504.14 |

FOREIGN PATENT DOCUMENTS

| | | | |
|---|---|---|---|
| 2-298812 | 12/1990 | Japan | 73/504.12 |
| 3-172713 | 7/1991 | Japan | 73/504.12 |
| 6-74773 | 3/1994 | Japan | 73/504.12 |

*Primary Examiner*—Hezron E. Williams
*Assistant Examiner*—Helen C. Kwok
*Attorney, Agent, or Firm*—Nikaido Marmelstein Murray & Oram LLP

[57]   ABSTRACT

A piezoelectric vibrator 12 used for a vibrating gyroscope 10 includes a vibrating body 14 having, for example, regular triangular prism shape. Piezoelectric elements 14a, 14b and 14c are formed respectively on three side faces of the vibrating body 14. Supporting members 24a and 24b are attached to a ridge line of the vibrating body 14 in the vicinity of nodal points. The supporting members 24a and 24b are secured to two supporting substrates 26a and 26b. The supporting substrates 26a and 26b are attached to a base substrate 30 via buffer blocks 28a and 28b. The vibrating body 14 makes a bending vibration, and two ridge lines (A) at symmetrical portions against basic bending vibration are pressed, and the hardness of the two ridge line portions (A) is made high.

7 Claims, 3 Drawing Sheets

PIEZOELECTRIC VIBRATOR

BACKGROUND, OF THE INVENTION

1. Field of the Invention

The present invention relates to a piezoelectric vibrator and, more particularly, to a piezoelectric vibrator used for a vibrating gyroscope for detecting a rotational angular velocity.

2. Description of the Prior Art

FIG. 5 is a perspective view showing an example of a vibrating gyroscope using a conventional piezoelectric vibrator, and FIG. 6 is a sectional view of it. A vibrating gyroscope 1 includes a piezoelectric vibrator 2. The piezoelectric vibrator 2 includes a vibrating body 3 having, for example, a regular triangular prism shape. Piezoelectric elements 4a, 4b and 4c are formed respectively to three side faces of the vibrating body 3. A ridge line of the vibrating body 3 is supported at two portions in the vicinity of two nodal points by supporting members 5. An oscillation circuit is connected between the piezoelectric elements 4a, 4b and the piezoelectric element 4c. The piezoelectric elements 4a and 4b are connected to a differential circuit. The differential circuit is connected to a detecting circuit, and the detecting circuit is connected to a smoothing circuit.

The vibrating body 3 makes a bending vibration in a direction perpendicular to the face of the piezoelectric element 4c by a driving signal of the oscillation circuit. When a rotational angular velocity is not applied to the vibrating gyroscope 1, the piezoelectric elements 4a and 4b bend in a same manner, and the same signals are supplied to the differential circuit. Input signals are offset in the differential circuit, and an output signal is not obtained from the differential circuit. When the vibrating gyroscope 1 rotates about the axis of the vibrating body 3, the vibrating direction of the vibrating body 3 changes due to a Coriolis force. Thus, bending conditions of the piezoelectric elements 4a and 4b are changed, and different voltages are generated in the piezoelectric elements 4a and 4b which are connected to the differential circuit. The output signal is obtained from the differential circuit, and the signal is detected by the detecting circuit and smoothed by the smoothing circuit. Since a smoothed signal corresponds to the rotational angular velocity, the rotational angular velocity applied to the vibrating gyroscope 1 is detected by measuring the smoothed signal.

When the vibrating body used for the piezoelectric vibrator 2 is manufactured, the vibrating body 3 having a regular triangular prism shape is formed by die deforming or roll deforming of a rod made of constant elastic metal material. The ridge line of the vibrating body 3 is cut for adjusting a resonance frequency of the vibrating body 3. When the width of the vibrating body 3 is shortened, the resonance frequency of the vibrating body 3 becomes low.

The ridge line supported by the supporting members 5 is pressed for obtaining a bending vibration perpendicular to the side face of the piezoelectric element 4c exactly at the time of non-rotation. As the pressing method, for example, the method of hitting the ridge line of the vibrating body 3 is adopted. When the ridge line of the vibrating body 3 is pressed, the width of the vibrating body 3 is shortened, and the density of the vibrating body 3 is enlarged, resulting in high hardness of the ridge line portion. It has been known that the resonance frequency of the vibrating body 3 becomes high when the hardness becomes high. Thus, the lowering of the resonance frequency due to the shortening of width of the vibrating body 3 and the upwardness of the resonance frequency due to the upwardness of hardness of the vibrating body 3 are offset, and resulting in unchanged resonance frequency. The anisotropy is generated in vibrating tendency of the vibrating body by making difference of the hardness different between one ridge line and the other two ridge lines, and the bending vibration can be made to the vibrating body 3 in a direction perpendicular to the side face of the piezoelectric element 4c exactly. Therefore, the vibrating gyroscope 1 having preferable drift characteristics can be obtained.

However, when the method of pressing one ridge line of the vibrating body is adopted, there is a vibrating body having unstable bending vibration, and resulting in undesirable drift characteristics. There is a method that the hardness of each ridge line portions of the vibrating body is measured firstly, and one ridge line to be pressed is selected for obtaining the piezoelectric vibrator having preferable drift characteristics. However, it is difficult to select the ridge line to be pressed.

SUMMARY OF THE INVENTION

It is, therefore, the primary object of the invention to provide a piezoelectric vibrator having preferable drift characteristics, and which can be manufactured easily.

The present invention is directed to a piezoelectric vibrator comprising a prism-shaped vibrating body for making a bending vibration, wherein a hardness of an exterior portion of the vibrating body in a direction of a basic bending vibration is lower than a hardness of other exterior portions of the vibrating body.

For obtaining the piezoelectric vibrator, symmetrical exterior portions of the vibrating body against the direction of the basic bending vibration are pressed to enlarge the hardness of pressed portions than the hardness of the exterior portion in the direction of the basic bending vibration.

It is applicable that the vibrating body is formed in a regular triangular prism shape, and two ridge lines of the vibrating body are pressed to enlarge the hardness of the pressed portions than the hardness of other one ridge line.

When there is a difference of the hardness between the exterior portions, the difference is generated in the degree of freedom for vibration. In this case, the degree of freedom in a direction of a low hardness becomes large, and the degree of freedom in a direction of a high hardness becomes small. Thus, the vibrating body is likely to make a bending vibration in a direction having a large degree of freedom. By pressing of symmetrical exterior portions of the vibrating body against the direction of the basic bending vibration, the density of the pressed portions is enlarged, and the hardness of the pressed portions becomes high. In the case of the vibrating body having a regular triangular prism shape, the vibrating body is likely to make a bending vibration in one ridge line direction by pressing the other two ridge line portions.

According to the present invention, the vibrating body is likely to make a bending vibration in one direction. Thus, the bending vibration of the vibrating body can be made in a right direction. When the piezoelectric vibrator is used for the vibrating gyroscope, a generation of the signal due to the divergence of the bending vibration can be prevented, and the vibrating gyroscope having preferable drift characteristics can be obtained. Only by pressing symmetrical portions of the vibrating body against a basic vibration, a stable vibration is obtained, and a selection of pressed portion is not required. Thus, the piezoelectric vibrator can be manufactured easily.

The above and further objects, features, aspects and advantages of the invention will more fully be apparent from the following detailed description of embodiments with reference to the accompanying drawings.

DESCRIPTION OF THE PREFERRED EMBODIMENTS

Figure 1:
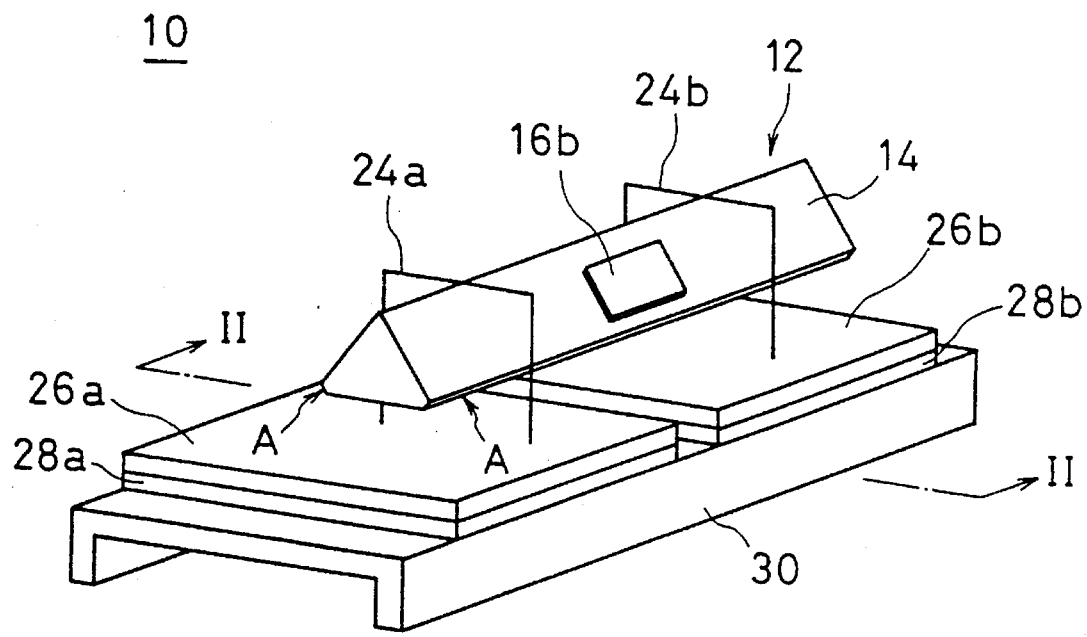
FIG. 1 is a perspective view showing an embodiment of a vibrating gyroscope using a piezoelectric vibrator of the present invention.
Figure 2:
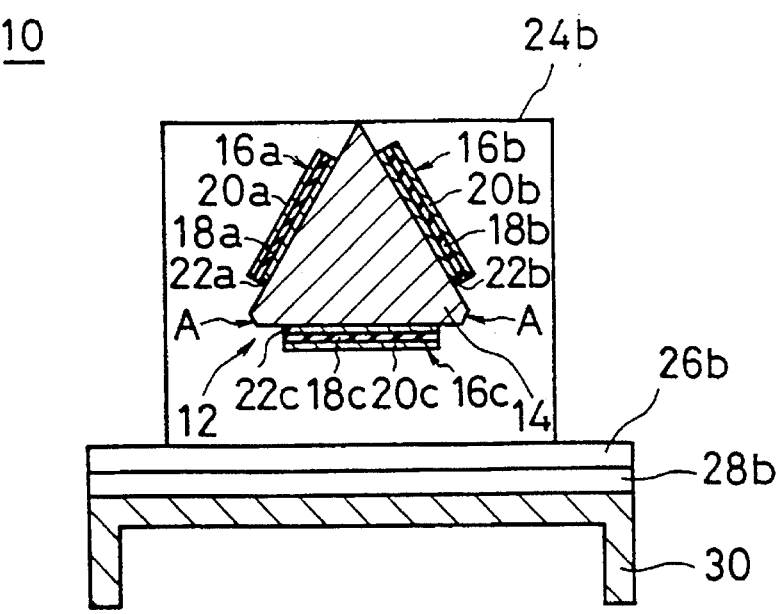
FIG. 2 is a sectional view on line II—II of FIG. 1.

The embodiment explains an example of a vibrating gyroscope using a piezoelectric vibrator of the present invention. FIG. 1 is a perspective view showing an embodiment of a vibrating gyroscope, and FIG. 2 is a sectional view on line II—II of FIG. 1. A vibrating gyroscope 10 includes a piezoelectric vibrator 12. The piezoelectric vibrator 12 includes a vibrating body 14 having, for example, a regular triangular prism shape. The vibrating body 14 is made of material which makes a mechanical vibration such as elinver, iron-nickel alloy, crystal, glass, quartz or ceramics.

Piezoelectric elements 16a, 16b and 16c are formed respectively at center portions on three side faces of the vibrating body 14. The piezoelectric element 16a includes a piezoelectric layer 18a formed of ceramics or the like, and electrodes 20a and 22a are formed on both faces of the piezoelectric layer 18a. One electrode 22a is bonded with an adhesive on the side face of the vibrating body 14. Similarly, the piezoelectric elements 16b and 16c include piezoelectric layers 18b and 18c respectively. Electrodes 20b, 22b and electrodes 20c, 22c are formed respectively on both faces of the piezoelectric layers 18b and 18c. One electrodes 22b and 22c are bonded with an adhesive on the side faces of the vibrating body 14.

A ridge line between the piezoelectric elements 16a and 16b is supported by supporting members 24a and 24b in the vicinity of two nodal points of the vibrating body 14. The supporting members 24a and 24b are formed in a U-shape with, for example, metal wires. The vibrating body 14 is attached to center portions of the supporting members 24a and 24b. End portions of the supporting members 24a and 24b are secured to supporting substrates 26a and 26b. The supporting substrates 26a and 26b are attached to a base substrate 30 via buffer blocks 28a and 28b having elasticity. The buffer blocks 28a and 28b are used for preventing an influence of a leakage vibration to the vibrating body 14 when the vibration of the vibrating body 14 leaks from the supporting members 24a and 24b.

Figure 3:
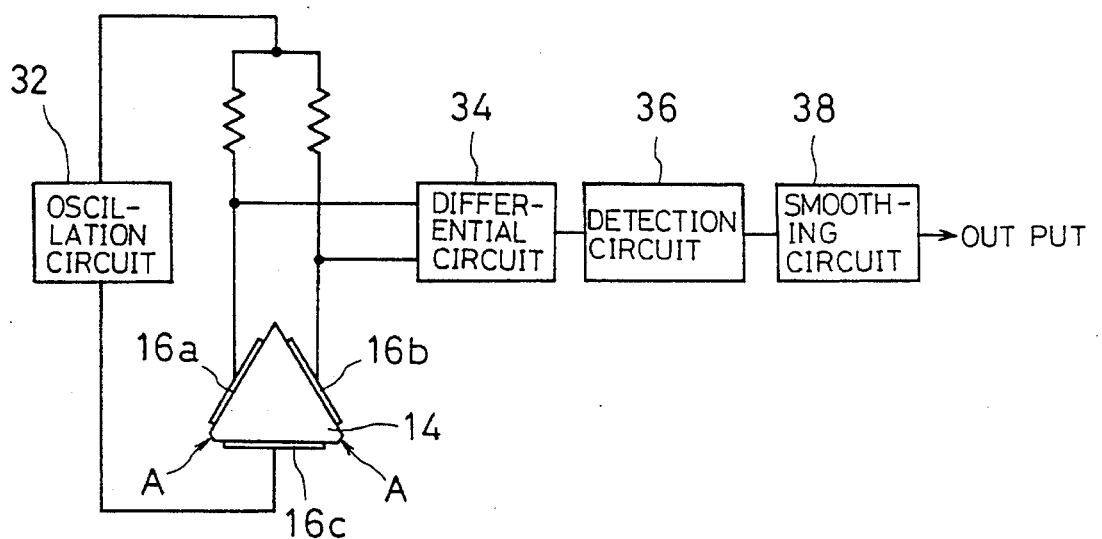
FIG. 3 is a block diagram showing a circuit for driving and detecting the vibrating gyroscope of FIG. 1.

For using the vibrating gyroscope 10, as shown in FIG. 3, an oscillation circuit 32 is connected between the piezoelectric elements 16a, 16b and the piezoelectric element 16c. A driving signal of the oscillation circuit 32 is supplied to the piezoelectric elements 16a and 16b, and an output signal of the piezoelectric element 16c is fedback to the oscillation circuit 32. The vibrating body 14 makes a bending vibration in a direction perpendicular to the side face of the piezoelectric element 16c by the driving signal of the oscillation circuit 32. The piezoelectric elements 16a and 16b are connected to input terminals of a differential circuit 34. An output terminal of the differential circuit 34 is connected to a detection circuit 36. A signal detected by the detection circuit 36 is smoothed by a smoothing circuit 38.

In the vibrating gyroscope 10, two ridge lines of the vibrating body 14 are pressed. In this case, two ridge lines (A) which are not supported by the supporting members 24a and 24b are pressed. As the pressing method, for example, the method of hitting the two ridge lines (A) is adopted. By pressing the two ridge lines of the vibrating body 14, the density of the two ridge line portion becomes large, and the hardness becomes high. Thus, anisotropy is generated in a vibrating tendency, and the vibrating body 14 is apt to make a bending vibration in a basic vibrating direction, that is a direction perpendicular to the side face of the piezoelectric element 16c.

A resonance frequency of the vibrating body 14 is decided by a width of the vibrating body 14 and Young's modulus. Since Young's modulus is decided by the hardness of the vibrating body 14, the resonance frequency of the vibrating body 14 changes by changing the hardness of the vibrating body 14. The width of the vibrating body 14 becomes short by pressing the ridge line, and resulting in low resonance frequency. However, the resonance frequency becomes high by increasing the hardness of a ridge line portion. Thus, even when the two ridge lines are pressed, changes of the resonance frequency are offset, and resulting in unchanged resonance frequency.

In the vibrating gyroscope 10, the vibrating body 14 makes a bending vibration in a direction perpendicular to the side face of the piezoelectric element 16c by the oscillation circuit 32. At this time, since the hardness of two ridge line portions is larger than the hardness of the other ridge line portion, the vibrating body 14 makes a bending vibration in a direction perpendicular to the piezoelectric element 16c exactly. The piezoelectric elements 16a and 16b bends in a same manner, and the same signals are supplied to the differential circuit 34. Thus, output signal is not obtained from the differential circuit 34, and it is known that a rotational angular velocity is not applied.

In this situation, when the vibrating gyroscope 10 rotates about the axis of the vibrating body 14, the vibrating direction of the vibrating body 14 changes by a Coriolis force. When the vibrating direction of the vibrating body 14 changes, the piezoelectric elements 16a and 16b bends in different manners, and different signals are obtained from the piezoelectric elements 16a and 16b. Since these signals are supplied to the differential circuit 34, the difference between two signals is obtained from the differential circuit 34. The output signal of the differential circuit 34 is detected by the detection circuit 36, and smoothed by the smoothing circuit 38. An output signal of the smoothing circuit 38 corresponds to the change of the vibrating direction of the vibrating body 14, that is the output signal corresponding to the Coriolis force. Thus, the rotational angular velocity applied to the vibrating gyroscope 10 can be detected by measuring the output signal of the smoothing circuit 38.

In the vibrating gyroscope 10, since the vibrating body 14 makes a bending vibration in a direction perpendicular to the piezoelectric element 16c exactly, the piezoelectric elements 16a and 16b bend in a same manner, and preferable drift characteristics can be obtained. By pressing any two ridge lines and attaching the supporting members 24a and 24b to the other ridge line, a stable bending vibration is obtained. When the vibrating gyroscope 10 is manufactured, it is not required that the hardness of the ridge line portions of the vibrating body 14 is measured previously, and then optional two ridge lines may be pressed. Thus, the vibrating gyroscope 10 can be manufactured easily.

Figure 4:
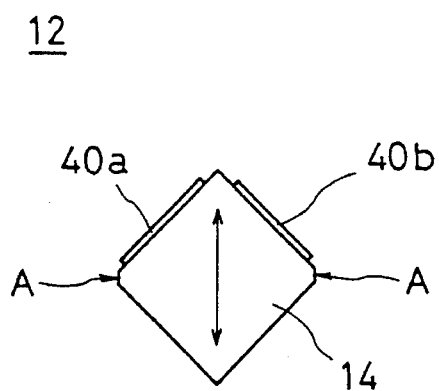
FIG. 4 is a sectional view showing a vibrating body used for a piezoelectric vibrator as an another embodiment of the present invention.
Figure 5:
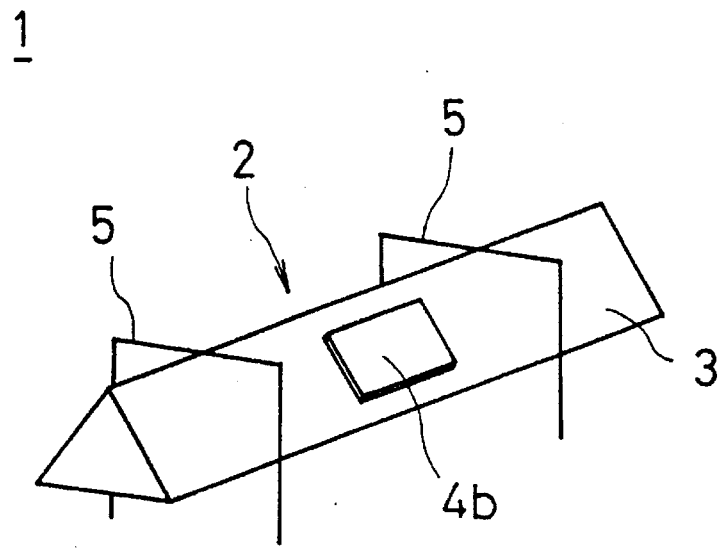
FIG. 5 is a perspective view showing an example of a vibrating gyroscope using a conventional piezoelectric vibrator.
Figure 6:
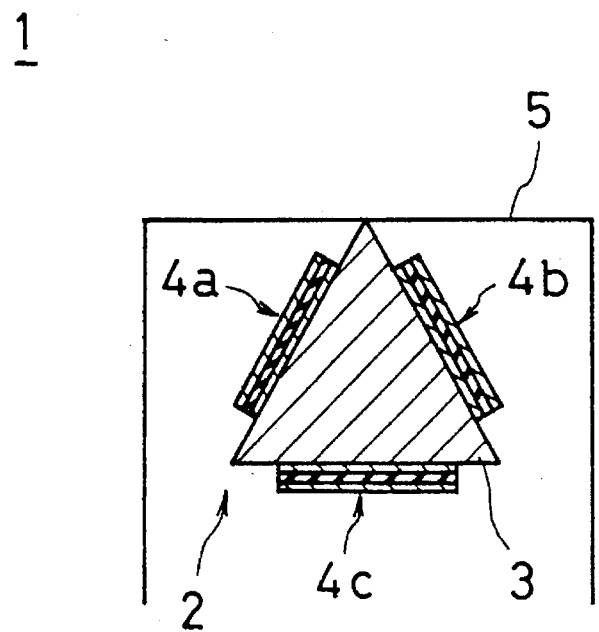
FIG. 6 is a sectional view showing the vibrating gyroscope using the conventional piezoelectric vibrator of FIG. 5.

In the above embodiment, though the vibrating body 14 is formed in a regular triangular prism shape, the vibrating body 14 may be formed in a rectangular prism shape as shown in FIG. 4. In the piezoelectric vibrator 12, piezoelectric elements 40a and 40b are formed on neighbor side faces of the vibrating body 14. In the piezoelectric vibrator 12, as shown by arrow in FIG. 4, a bending vibration can be made to the vibrating body 14 in a direction of opposite ridge lines by supplying driving signals to the piezoelectric elements 40a and 40b. In this piezoelectric vibrator 12, the ridge line portions (A) perpendicular to a basic bending vibration are pressed. In this case too, the bending vibration can be made to the vibrating body 14 in the direction of the opposite ridge lines exactly. The piezoelectric vibrator 14 can be used for the vibrating gyroscope having preferable drift characteristics. As such, the vibrating gyroscope 14 may be formed in a prism shape other than a regular triangular prism shape or in a cylindrical shape.

As the method of making portions having the different hardness, annealing may be adopted to make hardness low other than the method of pressing the vibrating body 14. For example, the regular triangular prism shaped vibrating body 14 is used, the ridge line attached to the supporting members 26a and 26b is annealed, and resulting in low hardness than the other two ridge lines. In the piezoelectric vibrator 12 too, the bending vibration can be made to the vibrating body 14 in the direction perpendicular to the piezoelectric element 16c, and the piezoelectric vibrator 12 can be used for the vibrating gyroscope having the preferable drift characteristics. In the case of using elinver as a material of the vibrating body, the vibrating body can be annealed by irradiating laser beam to the ridge line portion. The elinver has a property of annealing by rapid cooling after heating. Thus, by heating the ridge line portion of the vibrating body by laser beam, the ridge line portion is cooled rapidly by environmental temperature, and the ridge line portion of the vibrating body is annealed.

As the heating method for annealing the vibrating body, induction heating method may be adopted other than the laser beam method. As such, for making the difference of the hardness at the portions of the vibrating body, there are the methods of making the hardness high and making the hardness low. These methods may be selected optionally.

While the present invention has been particularly described and shown, it is to be understood that such description is used merely as an illustration and example rather than limitation, and the spirit and scope of the present invention is determined solely by the terms of the appended claims.

What is claimed is:

1. A piezoelectric vibrator comprising:

a prism-shaped vibrating body for making a bending vibration, said prism-shaped vibrating body having an exterior surface having exterior portions, wherein a hardness of one exterior portion of said vibrating body in a direction of a basic bending vibration is lower than a hardness of other exterior portions of the vibrating body.

2. A piezoelectric vibrator in accordance with claim 1, wherein said other exterior portions of said vibrating body against the direction of the basic bending vibration are symmetrically arranged and are formed having a hardness greater than the hardness of the exterior portion in the direction of the basic bending vibration.

3. A piezoelectric vibrator in accordance with claim 2, wherein said vibrating body is formed in a regular triangular prism shape have three ridge lines where sides of the vibrating body meet, and two ridge lines of said vibrating body are formed having the hardness greater than the hardness of the other one ridge line.

4. A piezoelectric vibrator in accordance with claim 2, wherein said vibrating body is formed in a rectangular prism shape having four ridge lines where sides of the vibrating body meet, and two ridge lines perpendicular to the basic bending vibration are formed having the hardness greater than the hardness of other two ridge lines.

5. A piezoelectric vibrator in accordance with claim 2, wherein the one exterior portion in the direction of the basic bending vibration is annealed, and the hardness of an annealed portion is made lower than the other exterior portions of said vibrating body.

6. A piezoelectric vibrator in accordance with claim 5, wherein the One exterior portion of said vibrating body in the direction of the basic bending vibration is heated by a laser beam, and a heated portion of said vibrating body is annealed.

7. A piezoelectric vibrator in accordance with claim 5, wherein the one exterior portion of said vibrating body in the direction of the basic bending vibration is heated by induction heating method, and a heated portion of said vibrating body is annealed.

* * * * *